May 13, 1952 A. C. SCHROEDER 2,596,918
TELEVISION RECEIVING SYSTEM
Filed Jan. 30, 1948
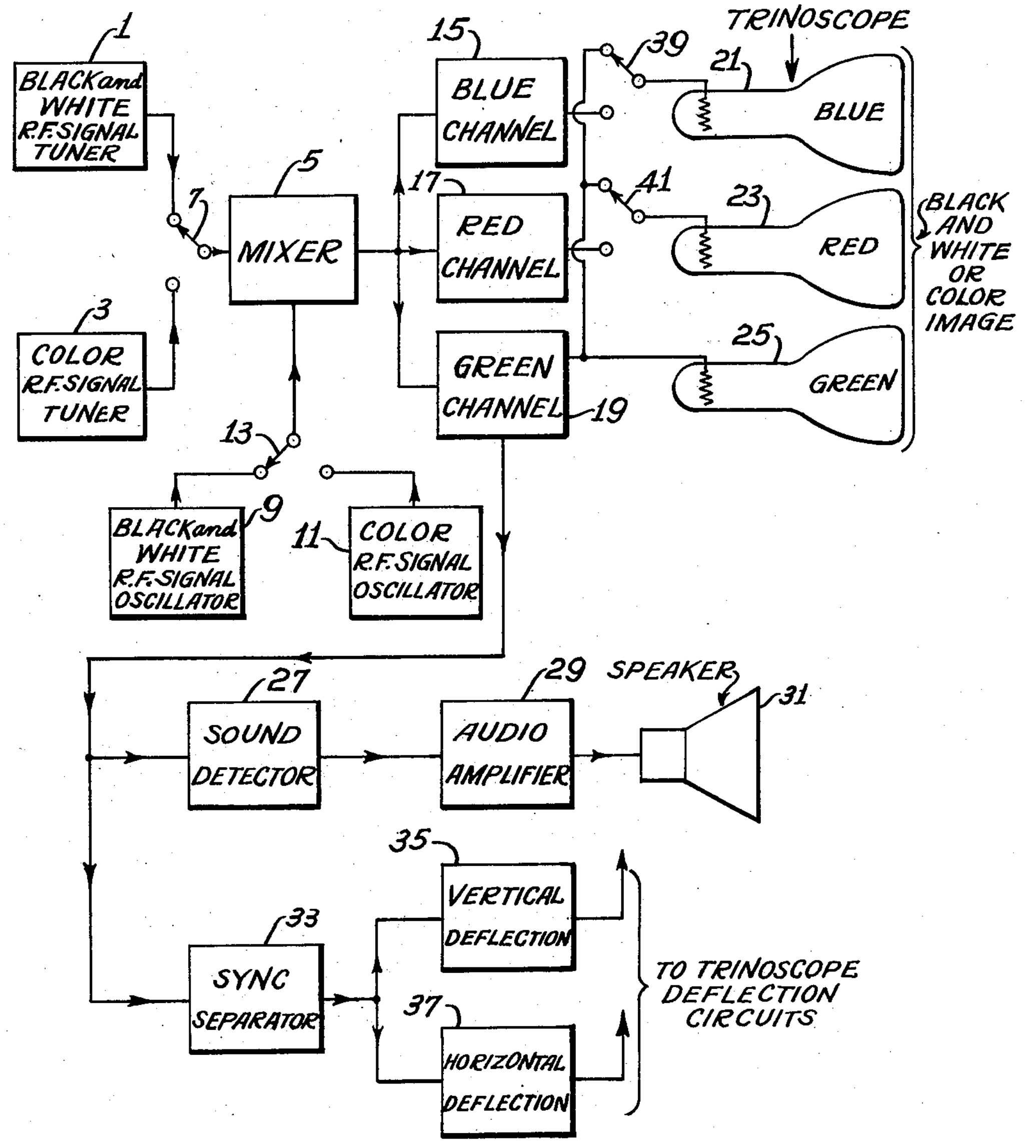
Inventor:
Alfred C. Schroeder
By [signature]
ATTORNEY Patented May 13, 1952

2,596,918

UNITED STATES PATENT OFFICE 2,596,918

TELEVISION RECEIVING SYSTEM

Alfred C. Schroeder, Feasterville, Pa., assignor to Radio Corporation of America, a corporation of Delaware Application January 30, 1948, Serial No. 5,437

8 Claims. (Cl. 178—5.4)

This invention relates to television, and more particularly to receiving set arrangements adaptable for reproducing images in black and white or images in substantially their natural color.

According to this invention, switching arrangements are provided to connect all of the selected components color image reproducing tubes to a single channel for the reproduction of black and white images or to connect the selected component color image reproducing tubes to their respective component color representative signal channels for the reception of images in substantially their natural color.

It is generally well known in the television art that transmission of visual information by electricity is characterized by the fact that a single electrical transmission circuit can carry but one item of information at a time. By analyzing the image into its image elements and deriving therefrom a signal train of impulses by an orderly sequence of scanning, the image may be reproduced at a remote location by reconstruction of the image in the same orderly sequence of scanning.

It is also well known that images in substantially their natural color may be reproduced by dividing the image into selected component colors and reproducing the image in substantially its natural color by superpositioning and accurate registry of the several selected component color images.

It is therefore possible that images in color may be transmitted over electrical paths by not only dividing images into their image elements, but also dividing images into selected component color images.

According to an article entitled "An Experimental Simultaneous Color Television System," beginning on page 861 of the "Proceedings of the Institute of Radio Engineers" for September, 1947, there is described a color television system involving, for image reproduction, what is popularly known as a "trinoscope."

The term "trinoscope" is a designation for an assembly of three kinescopes, three lenses and three deflection yokes which are energized from a common sawtooth deflection generator.

In view of the fact that the transmission of images in their natural color requires more elaborate and costly equipment, an extremely valuable service may be rendered by continuing to broadcast a large number of black and white type television signals. Furthermore, the large amount of information required to be transmitted for the faithful reproduction of images in substantially their natural color requires that an extremely wide pass band be employed. The transmission of black and white images is much more economical in this regard. It will therefore be desirable, even though natural color image reproducing arrangements are available in the receiver, that some provision should be made whereby the color receiving system can be conveniently and quickly converted from that of color reception and reproduction to that of monochrome or black and white reception and reproduction.

Such desirability is recognized in the co-pending U. S. application of George C. Sziklai, Serial No. 795,031, filed December 31, 1947, now Patent No. 2,545,420, granted March 31, 1951.

According to the co-pending application referred to above, a tuning arrangement is provided whereby quick and accurate switching may be had between the color and the black and white systems.

It will also be desirable to provide for monochrome reproduction of images from color signals.

It will be appreciated, however, that only a single image reproducing device is necessary for the provision of black and white images. It will be seen, therefore, that a normal procedure would be to operate only one kinescope of the trinoscope for the reproduction of black and white images.

It is a well known law of color physics that white light will result from the combination or addition of three primary colored lights such as red, blue and green. It therefore follows that a black and white image can be reproduced by applying the same signal to all three kinescopes of a trinoscope.

It will be remembered, however, that the band width requirements for black and white type television are not as great as the band width requirements for color. It is therefore only necessary to employ one channel of the three channel system for the conveyance of black and white type signals.

The practice of this invention makes it possible to utilize all three kinescopes of the trinoscope to provide a brighter black and white image. According to this invention, this is accomplished by employing a novel switching arrangement to selectively connect during reception of black and white image representative signals all three kinescopes of the trinoscope to a single signal channel adapted to transmit black and white representative signals. In additional forms of this invention which will be described in more detail below, a "gang" switching arrangement is provided for not only connecting all of the image reproducig devices together, but to suitably switch the tuning arrangements in order that rapid and convenient conversion from color to black and white image reproduction may be made.

Accordingly, a primary object of this invention is to provide an improved television system.

Another object of this invention is to arrange for a convenient conversion of a color receiver to a black and white image receiver.

Another object of this invention is to provide for increased brilliance of image during the reproduction of black and white images with a color television receiver.

Other and incidental objects of the invention will be apparent to those skilled in the art from a reading of the following specification and an inspection of the accompanying drawing which shows by block diagram one form of this invention.

Turning in more detail to the drawing, there is shown a signal tuner 1 which is adapted to receive radio frequency energy of a black and white radio frequency signal.

Tuner 3 is adapted to receive radio frequency signal energy of a color television system.

The tuners 1 and 3 are selectively connected to a mixer 5 by a switch 7.

The mixer 5 is supplied with the usual heterodyning signal oscillations from oscillators 9 and 11 through a switch 13. Oscillator 9 is adjusted to provide the necessary heterodyne for black and white image signal reception, while oscillator 11 is adapted to provide the necessary heterodyning signal for color radio frequency signals. The desired oscillator is, of course, connected to mixer 5 through switch 13.

It is intended in the practice of this invention that switches 7 and 13 will be operatively connected together to provide for unified control of switches 7 and 13.

Mixer 5 provides appropriate signals for the blue, red and green channels designated as blocks 15, 17 and 19 which, during the reception of color signals, provide kinescopes 21, 23 and 25 with appropriately designated color signals.

It is not believed that a detailed description of the diagrammatically illustrated system is necessary in view of the presently published art on the reproduction of television images in substantially their natural color. The article referred to above, entitled "An Experimental Simultaneous Color Television System" provides an excellent description of suitable circuit arrangements. The copending U. S. application of George C. Sziklai, Serial No. 760,400, filed July 11, 1947, shows and describes an improved intermediate frequency amplifier circuit arrangement suitable for employment in the practice of this invention.

The associated sound of the system is obtained from the green channel 19, detected in sound detector 7 and amplified in audio amplifier 29, to be reproduced in speaker 31. The usual synchronizing signal is, of course, necessary for the proper operation of this system and is derived through sync separator 33 to be converted into vertical deflection and horizontal deflection energy in circuit arrangements illustrated as blocks 35 and 37, respectively.

According to this invention, the switches 39 and 41 selectively connect in their lower position the blue and the red kinescopes 21 and 23 to their respective color channels 15 and 17, while at the other or upper position, switches 39 and 41 connect the blue and the red kinescopes 21 and 23 to the green channel.

In the form of the invention shown, the green signal channel 19 is employed for the transmission of the black and white representative signals. Any other channel may be employed, if desired. In this connection, it may also be indicated that a reasonably suitable black and white image can be obtained from a color system by utilizing the signal contained in the green signal channel. It will be seen, therefore, that the practice of this invention permits the reception of black and white images from a color television signal.

According to this invention in one of its forms, a mechanical or electrical coupling arrangement can be provided to permit switches 39 and 41 to be operated with a single control and simultaneously. According to this invention in one form, the coupling arrangement provided between switches 39 and 41 may also be extended to switches 7 and 13 in order that a single control may be provided for completely changing the system from a black and white image producing system to a color image producing system.

The present invention makes it possible for a color television receiver to be selectively used for the reception of signals representative of light intensity only (as in a black and white transmission) and to utilize the receiver in an efficient manner by applying the video signals to all of the image producing means, thus producing a brighter black and white image.

Having thus described the invention, what is claimed is:

1. In a color television system having an electrical signal channel for each of a plurality of different signal trains representative of each of a plurality of different selected component colors and employing a plurality of different selected component color image reproducing devices arranged to form color separation images in registry to reproduce an image in substantially its natural color, a connection between one of said channels and a corresponding one of said color image reproducing devices, and a circuit switching arrangement to selectively connect in one position the other of said image reproducing devices to their corresponding color signal channels and in another position to connect the said other of said image reproducing devices to said one channel.

2. In a color television receiving system having an electrical signal channel for each of a plurality of different signal trains representative of each of a plurality of different selected component colors and employing different selected component color image reproducing means arranged to form color separation images in registry to reproduce an image in substantially its natural color, a fixed connection between a first of said channels and its corresponding color image reproducing means, a first signal switch to selectively connect in one position a second of said image reproducing means to its associated color signal channel and in another position to said first channel, and a second signal switch to selectively connect in one position a third of said image reproducing means to its associated color signal channel and in another position to said first channel.

3. In a color television receiving system having an electrical signal channel for each of a plurality of different signal trains representative of each of a plurality of different selected component colors and employing a plurality of different selected component color image reproducing electron guns arranged to form color separation images in registry to reproduce an image in substantially its natural color, a fixed connection between a first of said channels and its corresponding color image reproducing electron guns, a first signal switch to selectively connect in one position a second of said image reproducing electron guns to its associated color signal channel and in another position to said first channel, a second signal switch to selectively connect in one position a third of said image reproducing electron guns to its associated color signal channel and in another position to said first channel, and a mechanical connection between said first and second switch to permit unified control.

4. A color television system comprising in combination an electrical signal channel for each of a substantially red, blue and green component color image representative signal of a composite color television signal, a substantially red component color image reproducing device, a substantially blue component color image reproducing device, a substantially green component color image reproducing device, a permanent connection between one of said channels and its corresponding color image reproducing device, and a circuit switching arrangement to selectively connect in one position the other of said image reproducing devices to their associated color signal channel and in another position to said first channel.

5. A color television receiving system comprising in combination an electrical signal channel for each of a substantially red, blue and green component color image representative signal of a composite color television signal, a substantially red component color image reproducing device, a substantially blue component color image reproducing device, a substantially green component color image reproducing device, a connection between said substantially green component color image reproducing device and said green component color image representative signal channel, and a circuit switching arrangement to selectively connect in one position the other of said image reproducing devices to their associated color signal channel and in another position connect the other of said image reproducing devices to said green component color image representative channel.

6. In a color television system having an electrical signal channel for each of a plurality of different signal trains representative of each of a plurality of different selected component colors and employing a plurality of different selected component color image reproducing devices arranged to form color separation images in registry to reproduce an image in substantially its natural color, a connection between a first of said channels and its corresponding color image reproducing device, a first signal tuning arrangement adapted to provide television signal energy representative of a black and white image to one of said electrical signal channels, a second signal tuning arrangement adapted to provide television signal energy representative of a color image to said electrical signal channels, and a circuit switching arrangement to selectively connect in one position the other of said image reproducing devices to their associated color signal channel and in another position to said first channel, said circuit switching arrangement also operatively connecting one of said signal tuning arrangements to said signal channels.

7. In a color television system having an electrical signal channel for each of a plurality of different signal trains representative of each of a plurality of different selected component colors and employing a plurality of different selected component color image reproducing devices arranged to form color separation images in registry to reproduce an image in substantially its natural color, a permanent connection between a first of said channels and its corresponding color image reproducing device, a first signal tuning arrangement adapted to provide television signal energy representative of a black and white image to one of said electrical signal channels, a second signal tuning arrangement adapted to provide television signal energy representative of a color image to said electrical signal channels, a circuit switching arrangement to selectively connect in one position the other of said image reproducing devices to their associated color signal channel and in another position to said first channel, and a third signal switch to selectively connect in one position said second signal tuning arrangement to said signal channels, said third signal switch to selectively connect in another position said first signal tuning arrangement to the signal channel to which said image producing devices are permanently connected.

8. In a color television system having an electrical signal channel for each of a plurality of different signal trains representative of each of a plurality of different selected component colors and employing a plurality of different selected component color image reproducing devices arranged to form color separation images in registry to reproduce an image in substantially its natural color, a connection between a first of said channels and its corresponding color image reproducing device, a first signal tuning arrangement adapted to provide television signal energy representative of a black and white image to one of said electrical signal channels, a second signal tuning arrangement adapted to provide television signal energy representative of a color image to said electrical signal channels, a circuit switching arrangement to selectively connect in one position the other of said image reproducing devices to their associated color signal channel and in another position to said first channel, a third signal switch to selectively connect in one position said second signal tuning arrangement to said signal channels, said third signal switch to selectively connect in another position said first signal tuning arrangement to the signal channel to which said image producing devices are connected, and an operating connection between said switches to permit gang control.

ALFRED C. SCHROEDER.

REFERENCES CITED

The following references are of record in the file of this patent:

UNITED STATES PATENTS

| Number | Name | Date |
|---|---|---|
| 2,074,894 | Durand | Mar. 23, 1937 |
| 2,253,292 | Goldsmith | Aug. 19, 1941 |
| 2,333,969 | Alexanderson | Nov. 9, 1943 |
| 2,335,180 | Goldsmith | Nov. 23, 1943 |